US011656903B2

(12) United States Patent
Metsch et al.

(10) Patent No.: US 11,656,903 B2
(45) Date of Patent: May 23, 2023

(54) METHODS AND APPARATUS TO OPTIMIZE WORKFLOWS

(71) Applicant: Intel Corporation, Santa Clara, CA (US)

(72) Inventors: Thijs Metsch, Bruehl (DE); Joseph Butler, Stamullen (IE); Mohammad Mejbah Ul Alam, Milpitas, CA (US); Justin Gottschlich, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 816 days.

(21) Appl. No.: 16/451,974

(22) Filed: Jun. 25, 2019

(65) Prior Publication Data
US 2019/0317805 A1    Oct. 17, 2019

(51) Int. Cl.
*G06F 9/46*   (2006.01)
*G06F 9/48*   (2006.01)
*G06N 20/00*  (2019.01)

(52) U.S. Cl.
CPC ........... *G06F 9/4881* (2013.01); *G06N 20/00* (2019.01)

(58) Field of Classification Search
CPC .................................................... G06F 9/4881
USPC ............................................................ 718/105
See application file for complete search history.

(56) References Cited

U.S. PATENT DOCUMENTS

| 10,013,656 B1* | 7/2018 | Ciarlini | G06F 9/453 |
| 10,909,503 B1* | 2/2021 | Dias | G06N 20/00 |
| 2009/0210368 A1* | 8/2009 | Deo | G06K 9/6267 706/20 |
| 2011/0099158 A1* | 4/2011 | Magnuson | G06Q 10/04 707/E17.108 |
| 2011/0276915 A1* | 11/2011 | Freire | G06Q 10/00 715/772 |
| 2013/0035976 A1* | 2/2013 | Buffett | G06F 17/40 705/7.26 |
| 2014/0025426 A1* | 1/2014 | Doehring | G06Q 10/06 705/7.27 |
| 2014/0129172 A1* | 5/2014 | Eberhardt | G01N 1/28 702/108 |
| 2016/0246271 A1* | 8/2016 | Shen | G06F 8/38 |

(Continued)

OTHER PUBLICATIONS

Gottschlich et al., "The Three Pillars of Machine Programming", ArXiv, May 8, 2018, retrieved from https://arxiv.org/pdf/1803.07244.pdf, 11 pages.

(Continued)

*Primary Examiner* — Mehran Kamran
(74) *Attorney, Agent, or Firm* — Hanley, Flight & Zimmerman, LLC

(57) ABSTRACT

Methods, apparatus, systems and articles of manufacture are disclosed that optimize workflows. An example apparatus includes an intent determiner to determine an objective of a user input, the objective indicating a task to be executed in an infrastructure, a configuration composer to compose a plurality of workflows based on the determined objective, a model executor to execute a machine learning model to create a confidence score relating to the plurality of workflows, and a workflow selector to select at least one of the plurality of workflows for execution in the infrastructure, the selection of the at least one of the plurality of workflows based on the confidence score.

25 Claims, 9 Drawing Sheets

(56) References Cited

U.S. PATENT DOCUMENTS

| | | | | |
|---|---|---|---|---|
| 2016/0378861 | A1* | 12/2016 | Eledath | G06T 19/006 707/766 |
| 2017/0031711 | A1* | 2/2017 | Wu | G06F 9/4881 |
| 2017/0212928 | A1* | 7/2017 | Abebe | G06F 40/51 |
| 2017/0270431 | A1* | 9/2017 | Hosabettu | G06Q 10/06 |
| 2018/0089591 | A1* | 3/2018 | Zeiler | G06F 3/048 |
| 2018/0089592 | A1* | 3/2018 | Zeiler | G06N 20/00 |
| 2018/0124098 | A1* | 5/2018 | Carver | G06N 20/00 |
| 2018/0157971 | A1* | 6/2018 | Fusi | G06F 17/16 |
| 2018/0173403 | A1* | 6/2018 | Carbune | G06Q 50/12 |
| 2018/0341806 | A1* | 11/2018 | Chavez | G06V 10/94 |
| 2019/0138946 | A1* | 5/2019 | Asher | G06N 5/04 |
| 2019/0205792 | A1* | 7/2019 | Huang | G06F 9/4881 |
| 2019/0306045 | A1* | 10/2019 | Avdesh Khanna | H04L 67/10 |
| 2019/0317740 | A1* | 10/2019 | Herr | G06N 3/08 |
| 2019/0324893 | A1* | 10/2019 | Vaishnav | G06F 11/3664 |
| 2019/0339950 | A1* | 11/2019 | Meyer | G06F 8/38 |
| 2019/0378052 | A1* | 12/2019 | Badhwar | G06N 20/00 |
| 2020/0218623 | A1* | 7/2020 | Zhang | G06N 7/005 |
| 2020/0401491 | A1* | 12/2020 | Mohamed | G06F 11/2273 |
| 2021/0049525 | A1* | 2/2021 | Unger | G06Q 10/0633 |

OTHER PUBLICATIONS

Google, "Cloud AutoML-Train high-quality custom machine learning models with minimal effort and machine learning expertise," [https://cloud.google.com/automl/], retrieved on May 31, 2019, 9 pages.

Wikipedia, "Serverless Computing," [https://en.wikipedia.org/wiki/Serverless_computing], retrieved on Sep. 25, 2019, 5 pages.

Wikipedia, "Microservices," [https://en.wikipedia.org/wiki/Microservices], retrieved on Sep. 25, 2019, 8 pages.

Wikipedia, "Platform as a service," [https://en.wikipedia.org/wiki/Platform_as_a_service], retrieved on Sep. 25, 2019, 5 pages.

Apache, "Apache Airflow Documentation," [https://airflow.apache.org/], retrieved on Sep. 25, 2019, 11 pages.

Istio, "What is Istio?" [https://istio.io/docs/concepts/what-is-istio/], retrieved on Sep. 25, 2019, 6 pages.

Likhachev et al., "Anytime Dynamic A*: An Anytime, Replanning Algorithm," [http://www.cs.cmu.edu/~ggordon/likhachev-etal.anytime-dstar.pdf], Proceedings of the International Conference on Automated Planning and Scheduling (ICAPS), Jan. 2005, pp. 262-271, retrieved on Sep. 25, 2019, 10 pages.

Koenig, "D* Lite," [http://idm-lab.org/bib/abstracts/papers/aaai02b.pdf]. Based Real-Time Multi-Agent Path Planning in Dynamic Environments. International Journal of Engineering Research and Applications, Mar. 2012, pp. 1414-1419, retrieved on Sep. 25, 2019, 8 pages.

Wikipedia, "Genetic Algorithm," [https://en.wikipedia.org/wiki/Genetic_algorithm], retrieved on Sep. 25, 2019, 13 pages.

Brafman, "A Privacy Preserving Algorithm for Multi-Agent Planning and Search," [https://www.ijcai.org/Proceedings/15/Papers/219.pdf], Proceedings of the Twenty-Forth International Joint Conference on Artificial Intelligence (IJCAI 2015), Jul. 25, 2015, pp. 1530-1536, retrieved on Sep. 25, 2019, 7 pages.

* cited by examiner

```
501 {
502 "endstates": [{
503         "backedup": {}
504     }, {
505         "annotated": {
506             "creationdate": "True"
507         }
508     },
509     {
510         "authorized": {}
511     },
512     {
513         "replicated": {
514             "number": 3
515         }
516     },
517     {
518         "transcoded": {
519             "sizes": [720, 1080]
520         }
521     }
522 ]
523 }
```

FIG. 5

METHODS AND APPARATUS TO OPTIMIZE WORKFLOWS

FIELD OF THE DISCLOSURE

This disclosure relates generally to machine workflows, and, more particularly, to methods and apparatus to optimize workflows.

BACKGROUND

Function as a service (FaaS), microservices, platform as a service (PaaS), and/or other similar cloud computing services are platforms that allow for the development, execution, and/or management of applications and/or programs. Such applications and/or programs include code blocks and/or functions that may be modular in nature and/or reused for other similar applications and/or programs. The code blocks and/or functions are typically coupled together for execution using a defined pipeline, service mesh, workflow, machine learning pipeline, etc.

BRIEF DESCRIPTION OF THE DRAWINGS

FIG. 5 is example pseudocode representative of a service description including the objective(s) of FIG. 1.

Figure 1:
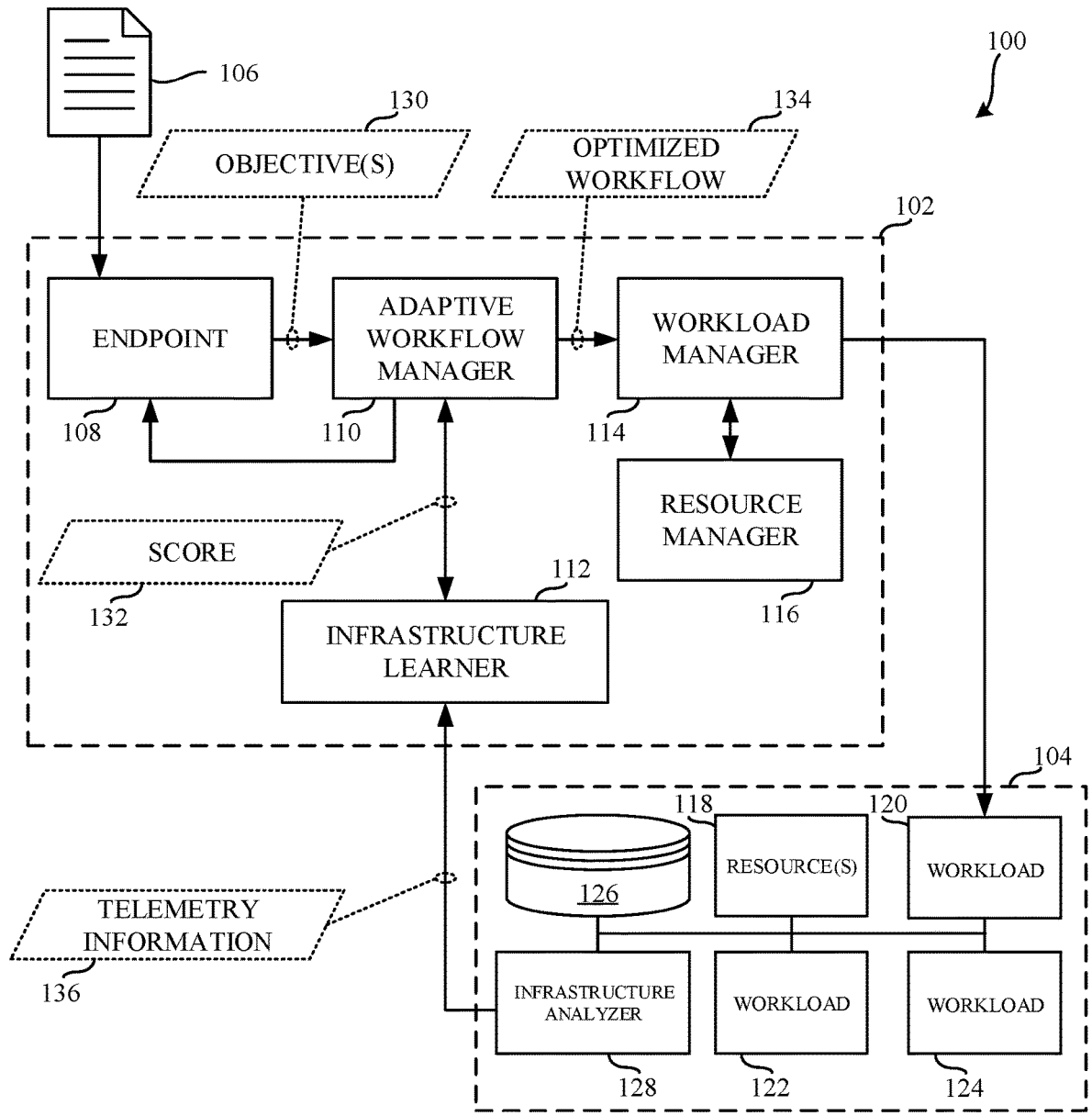
FIG. 1 is a block diagram of an example system including an example orchestrator and an example infrastructure.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In typical FaaS, microservices, PaaS, and/or other similar cloud computing services, the pipeline and/or workflow of an application and/or program to be executed is pre-defined (e.g., hard-coded) by the developer of such application and/or program to be executed. A pre-defined (e.g., hard-coded) pipeline and/or workflow is an execution technique that enables the coupling of various code blocks or functions for execution. Such a pre-defined (e.g., hard-coded) pipeline and/or workflow includes a list of workloads (e.g., tasks) to be executed and is typically tailored to the present context of the infrastructure or processing environment. For example, a developer may have knowledge of the present context of the infrastructure or processing environment and, thus, pre-define (e.g., hard code) a pipeline and/or workload specifically tailored for the present context of the infrastructure or processing environment.

Often times, the context of an infrastructure or processing environment changes (e.g., elements are removed, elements are updated, etc.). Example context changes of an infrastructure or processing environment include changes in the environment (e.g., new heterogenous infrastructure available), changes in usage patterns, and/or temporal or spatial changes in the environment (e.g., a device failure, broken device, etc.). Because typical pipelines and/or workflows are pre-defined (e.g., hard-coded), the efficiency of such a pipeline and/or workflow may be decreased as a result of the inability to adapt to context changes in an infrastructure or processing environment.

Certain approaches to improving the efficiency of pipelines and/or workflows involve a pipeline and/or workflow handling service focused on the scheduling of the workloads (e.g., tasks) in the pre-defined (e.g., hard-coded) pipeline and/or workflow. As such, the scheduling is dependent on a present context of an infrastructure or processing environment and defines when the workloads (e.g., tasks) are to be executed and the execution location of the workload (e.g., tasks execution) (e.g., when and where). Such approaches involving pipeline and/or workflow handling services are likewise unable to adapt to context changes in an infrastructure or processing environment.

Examples disclosed herein include methods and apparatus to optimize pipelines and/or workflows in an infrastructure or processing environment. In examples disclosed herein, a pipeline and/or workflow is generated based on an objective (e.g., intent and/or otherwise end-goal) provided by the developer of an application or program to be executed. As such, the developer of an application or program to be executed defines the objective (e.g., intent and/or otherwise end-goal) of the pipeline and/or workflow and examples disclosed herein generate the optimal pipeline and/or workflow based on such an objective (e.g., intent and/or otherwise end-goal).

Examples disclosed herein utilize planning algorithms to automatically generate an optimal pipeline and/or workflow for components in an infrastructure or processing environment. Further, examples disclosed herein utilize artificial intelligence (AI) models to learn from context changes in an infrastructure or processing environment and adapt a corresponding pipeline and/or workflow based on such context changes. As such, examples disclosed herein enable efficient operation of a pipeline and/or workflow regardless of context changes in an infrastructure or environment.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a deep neural network (DNN) and/or a recurrent neural network (RNN) model is used. In general, machine learning models/architectures that are suitable to use in the example approaches disclosed herein will be supervised. However, other types of machine learning models could additionally or alternatively be used such as a support vector machine (SVM), a convolutional neural network (CNN), a suitable unsupervised model, etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.)

In examples disclosed herein, ML/AI models are trained using any suitable training algorithm (e.g., Stochastic Gradient Descent). However, any other training algorithm may additionally or alternatively be used. In examples disclosed herein, training is performed until a threshold accuracy level is reached (e.g., 90% accuracy). In examples disclosed herein, training is performed at in a local machine or remotely at a datacenter. Training is performed using hyperparameters that control how the learning is performed (e.g., a learning rate, a number of layers to be used in the machine learning model, etc.). In examples disclosed herein, hyperparameters are selected by, for example, an automatic hyperparameter searching technique (e.g., Google CLOUD AUTOML). In some examples re-training may be performed. Such re-training may be performed in response to new training data arriving from different sources (e.g., new source repositories, feedback data created by analyzing the current predictions of the model, etc.).

Training is performed using training data. In examples disclosed herein, the training data originates from publicly available data. Alternatively, in examples disclosed herein, the training data may originate from locally generated data based on a current prediction. Because supervised training is used, the training data is labeled. Labeling is applied to the training data by parsing existing software and performing static analysis to label the code accordingly. In some examples, the training data is pre-processed using, for example, embedding and normalization. In some examples, the training data is sub-divided to indicate data to be used for validation.

Once training is complete, the model is deployed for use as an executable construct that processes an input and provides an output based on the network of nodes and connections defined in the model. The model is stored at in a suitable cloud environment. Alternatively, the model may be stored locally on an endpoint device. The model may then be executed by the model executor.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

In one example disclosed herein, a developer of an application and/or program to be executed may define the objective (e.g., intent and/or otherwise end-goal) of having data objects derived from a video stream, stored, backed up, and replicated across the globe. Such an objective (e.g., intent and/or otherwise end-goal) involves the computing workloads or tasks of transcoding, detecting, storing, backing up, replicating, etc. In such an example, if a context change in the corresponding infrastructure or processing environment occurs (e.g., future network bandwidth is restricted), then methods and apparatus disclosed herein can alter the pipeline and/workflow to perform bandwidth heavy processes (e.g., transcoding, replicating) first.

Examples disclosed herein enable a developer or customer to operate complex, large-scale heterogenous infrastructures by adaptively altering corresponding pipelines and/or workflows based on a developer objective and changes in the heterogenous infrastructure.

FIG. 1 is a block diagram of an example system 100 including an example orchestrator 102 and an example infrastructure 104. In FIG. 1, the orchestrator 102 is configured to obtain an example service description 106. Additionally, the orchestrator 102 includes an example endpoint 108, an example adaptive workflow manager 110, an example infrastructure learner 112, an example workload manager 114, and an example resource manager 116. In the example of FIG. 1, the infrastructure 104 includes example resource(s) 118, example workloads 120, 122, 124, an example infrastructure database 126, and an example infrastructure analyzer 128.

In examples disclosed herein, the orchestrator 102 may be implemented using a cloud computing platform (e.g., OpenStack). Alternatively, in some examples disclosed herein, the orchestrator 102 may be implemented locally (e.g., in a datacenter) with the infrastructure 104.

In the example illustrated in FIG. 1, the service description 106 is a descriptive list provided by a developer illustrating the developer's objective (e.g., intent and/or otherwise end-goal). In examples disclosed herein, the service description is a list including a set of code blocks and/or functions to be used to illustrate the developer's objective (e.g., intent and/or otherwise end-goal). As such, each set of code blocks and/or functions may represent individual objectives (e.g., intents and/or otherwise end-goals) provided by the developer. In examples disclosed herein, the service description 106 is sent to the endpoint via any suitable wired and/or wireless communication method (e.g., via Bluetooth® communication, via Local Area Network (LAN) communication, via Wireless Local Area Network (WLAN) communication, etc.).

In FIG. 1, the endpoint 108 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In FIG. 1, the endpoint 108 is a device included in the orchestrator 102 configured to obtain the service description 106. In examples disclosed herein, the endpoint 108 communicates example objective(s) 130 (e.g., intent(s) and/or otherwise end-goal(s)) derived from the service description 106 to the adaptive workflow manager 110. In other examples disclosed herein, the endpoint 108 may be a device outside of the orchestrator 102.

The adaptive workflow manager 110 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In the example illustrated in FIG. 1, the adaptive workflow manger 110 is configured to obtain the objective(s) 130 from the endpoint 108 and an example score 132 from the infrastructure learner 112. In FIG. 1, the score 132 represents a result generated by the infrastructure learner 112 and is explained in further detail below. The adaptive workflow manager 110 utilizes the objective(s) 130 and the score 132 to generate an example optimized workflow 134. In operation, the adaptive workflow manager 110 generates the optimized workflow 134 and may alter the optimized workflow 134 based on the score 132. The operation of the adaptive workflow manager 110 is explained in further detail below.

The infrastructure learner 112 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In the example of FIG. 1, the infrastructure learner 112 is implemented by a neural network such as a DNN, a RNN, and/or both. In FIG. 1, the infrastructure learner 112 is communicatively coupled to the infrastructure 104 to obtain example telemetry information 136.

In FIG. 1, the infrastructure learner 112 utilizes time series analysis to forecast a future context of the infrastructure 104. As such, the telemetry information 136 may be in the form of time series data. The telemetry information 136 is provided to the infrastructure learner 112 and includes metrics such as central processing unit (CPU) utilization in the infrastructure 104, metric information of a network interface card (NIC) (e.g., wired and/or wireless communication), metric information of a solid-state drive (SSD) such as memory usage, power usage, etc. In operation, the infrastructure learner 112 determines the score 132 based on the telemetry information 136. The score 132 may be a numerical value ranging from zero (0) to one (1). In addition, the score 132 may represent a confidence level indicating the likelihood of successful execution of the workflows generated by the adaptive workflow manager 110. For example, the adaptive workflow manager 110 may generate possible pipeline and/or workload configuration options (e.g., possible configurations) based on the objective(s) 130 and transmit such possible pipeline and/or workload configuration options to the infrastructure learner 112. In such an example, the infrastructure learner 112 may generate the score 132 for each respective possible pipeline and/or workload configuration options. Further in such an example, the respective scores (e.g., the score 132) may include a respective confidence level that weights the likelihood of successful execution of the possible pipeline and/or workflow configuration based on the telemetry information 136 and knowledge of the infrastructure 104. As such, the adaptive workflow manager 110 can interpret the score 132 to adjust and generate the optimized workflow 134. Therefore, the optimized workflow 134 is altered based on current knowledge (e.g., the current context) and a predicted future context of the infrastructure 104.

The workload manager 114 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In addition, the resource manager 116 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

In the example of FIG. 1, the workload manager 114 is configured to obtain the optimized workflow 134 from the adaptive workflow manager 110. As such, the workload manager 114 communicates such optimized workflow 134 to the resource manager 116. In operation, the workload manager 114 and the resource manager 116 communicate with the infrastructure 104 to identify the available resource(s) 118 and/or workloads 120, 122, 124 for use in execution of the optimized workflow 134. In examples disclosed herein, an initial execution of the optimized workflow 134 may be based on the selection of resource(s) 118 and/or workloads 120, 122, 124 by the workload manager 114 and the resource manager 116. In such an example, as the infrastructure learner 112 obtains the telemetry information 136 and produces the score 132, the optimized workflow 134 will be more efficient and, as such, the workload manager 114 and the resource manager 116 will assign and manage execution of the optimized workflow 134 using the resource(s) 118 and the workloads 120, 122, 124.

In the example of FIG. 1, the workloads 120, 122, 124 are configured to be executed using the resource(s) 118. As such, the workloads 120, 122, 124 represent assigned tasks and/or instructions managed by the workload manager 114 and the resource manager 116 of the orchestrator 102. In FIG. 1, the order of execution of the workloads 120, 122, 124 is determined by the workload manager 114 based on the optimized workflow 134. In operation, metrics relating to the execution of the workloads 120, 122, 124 are stored in the infrastructure database 126. In other examples disclosed herein, there may be any suitable number of workloads 120, 122, 124 configured to be executed using the resource(s) 118. For example, there may be five, ten, thirty, etc., workloads configured to be executed using the resource(s) 118.

The example infrastructure database 126 of the illustrated example of FIG. 1 may be implemented by any device for storing data such as, for example, flash memory, magnetic media, optical media, etc. Furthermore, the data stored in the example infrastructure database 126 may be in any data format such as, for example, binary data, comma delimited data, tab delimited data, structured query language (SQL) structures, etc. In FIG. 1, the infrastructure database 126 is operable to store metrics relating to the execution of the workloads 120, 122, 124 and/or any suitable metric relating to the operation of the infrastructure 104.

The infrastructure analyzer 128 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In the example of FIG. 1, the infrastructure analyzer 128 is configured to package the metrics stored in the infrastructure database 126 for use by the infrastructure learner 112. As such, the infrastructure analyzer 128 packages the telemetry information 136.

Figure 2:
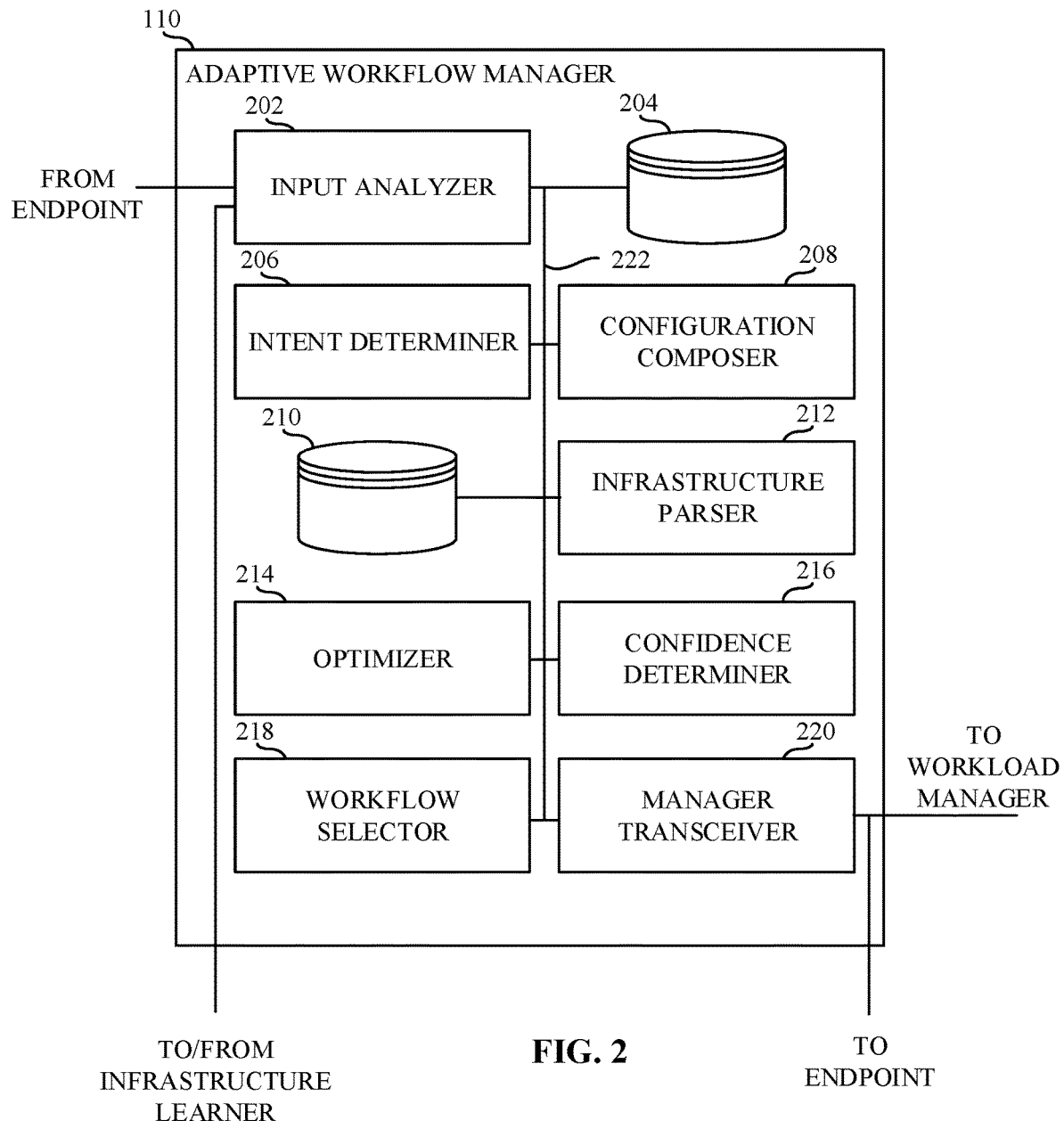
FIG. 2 is a block diagram of the example adaptive workflow manager of FIG. 1.

FIG. 2 is a block diagram of the example adaptive workflow manager 110 of FIG. 1. The adaptive workflow manager 110 includes an example input analyzer 202, an example task database 204, an example intent determiner 206, an example configuration composer 208, an example configuration database 210, an example infrastructure parser 212, an example optimizer 214, an example confidence determiner 216, an example workflow selector 218, and an example manager transceiver 220. In FIG. 2, any of the input analyzer 202, the task database 204, the intent determiner 206, the configuration composer 208, the configuration database 210, the infrastructure parser 212, the optimizer 214, the confidence determiner 216, the workflow selector 218, and/or the manager transceiver 220 may communicate via an example communication bus 222. In FIG. 2, the communication bus 222 may be implemented using any suitable communication method and/or apparatus (e.g., Bluetooth® communication, LAN communication, WLAN communication, etc.).

In the example illustrated in FIG. 2, the input analyzer 202 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The input analyzer 202 is configured to obtain and/or otherwise receive the objective(s) 130 from the endpoint 108 of FIG. 1. The input analyzer 202 is configured to determine whether the objective(s) 130 are obtained and/or otherwise available from the endpoint 108 of FIG. 1. In the event the input analyzer 202 determines (e.g., obtains) the objective(s) 130 from the endpoint 108, the input analyzer analyzes the objective(s) 130. For example, if the input analyzer 202 obtains a document corresponding to the objective(s) 130, then the input analyzer 202 may perform optical character recognition (OCR) and/or any other text processing technique on such document in order to analyze the objective(s) 130. In some examples disclosed herein, the input analyzer 202 may characterize and organize the objective(s) 130 for use by the intent determiner 206 (e.g., by order of processing power, by order of processing time, by alphabetical order, etc.).

In addition, the input analyzer 202 is configured to obtain the score 132 from the infrastructure learner 112 of FIG. 1. In such operation, the input analyzer 202 obtains the score 132 and stores the score 132 in any of the task database 204 and/or the configuration database 210. In addition, the input analyzer 202 is configured to transmit the obtained objective(s) 130 to the infrastructure learner 112 of FIG. 1 in order for the infrastructure learner to generate the score 132. In such an example, the score 132 is associated with the objective(s) 130. In some examples disclosed herein, the input analyzer 202 may communicate with the task database 204 to retrieve all known tasks (e.g., previously known tasks, actuators) for use in comparison in the event the objective(s) 130 is/are received.

In the example illustrated in FIG. 2, the task database 204 may be implemented by any device for storing data such as, for example, flash memory, magnetic media, optical media, etc. Furthermore, the data stored in the example task database 204 may be in any data format such as, for example, binary data, comma delimited data, tab delimited data, structured query language (SQL) structures, etc. In FIG. 2, the task database 204 is configured to store the objective(s) 130 obtained by the input analyzer 202. In such an example, the task database 204 is configured to store the objective(s) 130 in the same organized format provided by the input analyzer 202. Alternatively, in another example, if the task database 204 does not obtained an organized format of the objective(s) 130, then the task database 204 may organize the objective(s) 130 in a similar manner mentioned above.

In the example illustrated in FIG. 2, the intent determiner 206 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The intent determiner 206 determines the intent and/or otherwise objective of the objective(s) 130. For example, the objective(s) 130 may be in the form of a list of tasks and, as such, the intent determiner 206 determines the underlining intent of such tasks in the list of tasks and/or such list of tasks. In one example, if the objective(s) 130 indicate(s) a high-level command to perform video processing, then the intent determiner 206 can analyze such high-level command and determine the tasks associated with such a high-level command. In such a manner, the objective(s) may only be a high-level objective and/or otherwise intent for the intent determiner 206 can analyze.

In the example illustrated in FIG. 2, the configuration composer 208 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The configuration composer 208 communicates with the intent determiner 206 to compose and/or otherwise generate possible pipeline and/or workflow configuration options. In one example, the configuration composer 208 re-orders and generates a possible pipeline and/or workflow configuration option for each possible combination of tasks based on the objective(s) 130. Alternatively, if the input analyzer 202 determines the score 132 is available, then the configuration composer 208 can parse the score 132 to determine how the possible configuration options may be affected. In some examples disclosed herein, the score 132 may corresponding to a single possible configuration option and, as such, a higher score corresponds to a higher weight (e.g., likelihood of success). The configuration composer 208 stores the possible pipeline and/or workflow configuration options in the configuration database 210.

In addition, the configuration composer 208 is operable to remove inapplicable workflows from the configuration database 210. For example, if the score indicates one of the possible pipeline and/or workflow configuration options is unsuitable (e.g., a low score such as 0.1 because the computing power of the infrastructure cannot support such a possible pipeline and/or workflow configuration option), then the configuration composer 208 can remove such one of the possible pipeline and/or configuration options from the configuration database 210. Alternatively, the configuration composer may analyze the score 132 and determine one of the possible pipeline and/or workflow configuration options is inapplicable based on previous knowledge of a similar pipeline and/or workflow configuration option. For example, if a previous pipeline and/or configuration option was previously found to be inapplicable, then any similar pipeline and/or workflow configuration options may likewise be found to be inapplicable.

In some examples disclosed herein, the configuration composer 208 generates a state graph representative of the possible pipeline and/or workflow configuration options. Such a graph may illustrate a hierarchical order of tasks to be completed. In some examples disclosed herein, the state graph may be utilized to compare possible pipeline and/or workflow configuration options to determine if any inapplicable pipeline and/or workflow configuration options exist.

In the example illustrated in FIG. 2, the configuration database 210 may be implemented by any device for storing data such as, for example, flash memory, magnetic media, optical media, etc. Furthermore, the data stored in the example configuration database 210 may be in any data format such as, for example, binary data, comma delimited data, tab delimited data, structured query language (SQL) structures, etc. In FIG. 2, the configuration database 210 is configured to store the possible pipeline and/or workflow configuration options.

In FIG. 2, the infrastructure parser 212 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The infrastructure parser 212 of FIG. 2 communicates with any of the input analyzer 202, the task database 204, and/or the configuration database 210 to determine whether the score 132 from the infrastructure learner 112 of FIG. 1 is available. In the event the infrastructure parser 212 determines the score 132 is available, the infrastructure parser 212 parses the current state of the infrastructure 104 of FIG. 1 based on the score 132. In addition, the infrastructure parser 212 parses the infrastructure objective(s) based on the score 132 (e.g., determines whether the infrastructure 104 is intended to benefit high-paying customers, etc.). In examples disclosed herein, the information parsed by the infrastructure parser 212 may be additional learning knowledge utilized for data annotation.

In the example illustrated in FIG. 2, the optimizer 214 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The optimizer 214 implements planning and optimization algorithms such as Anytime Dynamic A*, D* Lite, evolutionary algorithms (e.g., a genetic algorithm (GA)), etc. The optimizer 214 determines, using planning and optimization algorithms, the optimal workflow 134 based on the possible pipeline and/or workflow configuration options.

In FIG. 2, the confidence determiner 216 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The confidence determiner 216 communicates with at least the input analyzer 202 to obtain a respective score for the possible pipeline and/or workflow configuration options. As such, the confidence determiner 216 utilizes the respective score to determine an associated confidence level with the possible pipeline and/or workflow configuration options. Such a confidence level may vary from zero (0) to one (1). Alternatively, any suitable numerical range or method may be utilized to represent the confidence level.

In the example of FIG. 2, the workflow selector 218 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The workflow selector 218 selects and/or otherwise defines the optimal possible pipeline and/or workflow configuration option having analyzed the optimal pipeline and/or workflow configuration option selected by the optimizer 214 and the confidence level determined by the confidence determiner 216. For example, if individual scores are associated with each possible pipeline and/or workflow configuration option, then the workflow selector 218 selects the optimal possible pipeline and/or workflow configuration option. Further in such an example, if one possible pipeline and/or workflow configuration option has an associated score of 0.9 and another possible pipeline and/or workflow configuration option has an associated score of 0.8, then the workflow selector 218 selects the possible pipeline and/or workflow configuration option having the associated score of 0.9. As such, the selected possible pipeline and/or workflow configuration option is considered the optimized workflow 134 of FIG. 1.

In the example illustrated in FIG. 2, the manager transceiver 220 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The manager transceiver 220 communicates the optimal workflow 134 selected by the workflow selector 218 to the workload manager 114 of FIG. 1. In addition, the manager transceiver 220 may communicates the optimal workflow 134 selected by the workflow selector 218 to the endpoint 108 of FIG. 1. In the illustrated example, the manager transceiver is implemented by a WiFi radio. In some examples, the manager transceiver 220 facilitates wired communication via an Ethernet network. In other examples disclosed herein, any other type of wireless transceiver may additionally or alternatively be used to implement the manager transceiver 220.

Figure 3:
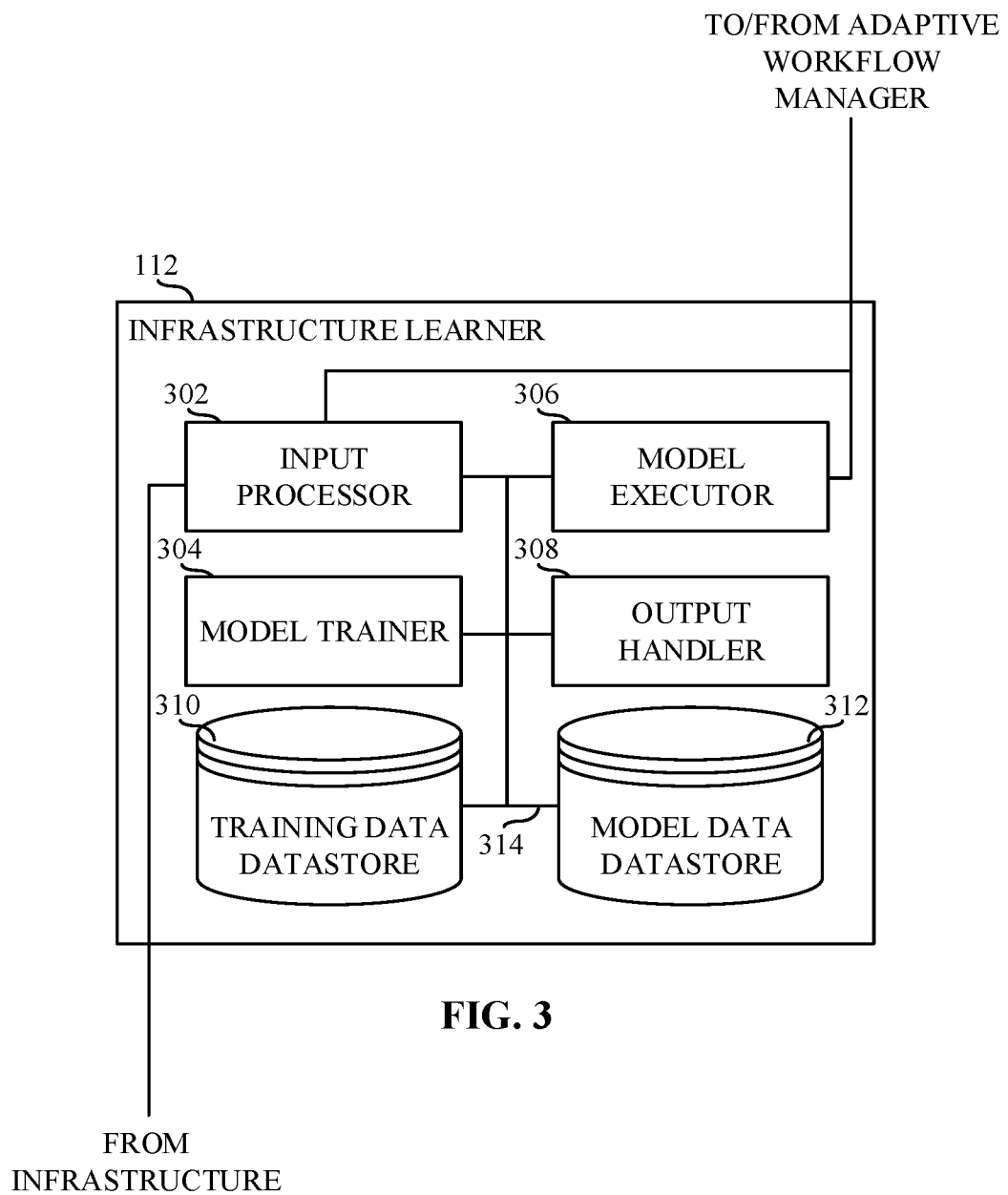
FIG. 3 is a block diagram of the example infrastructure learner of FIG. 1.

FIG. 3 is a block diagram of the example infrastructure learner 112 of FIG. 1. The infrastructure learner 112 includes an example input processor 302, an example model trainer 304, an example model executor 306, an example output handler 308, an example training data datastore 310, and an example model data datastore 312. In FIG. 3, any of the input processor 302, the model trainer 304, the model executor 306, the output handler 308, the training data datastore 310, and/or the model data datastore may communicate via an example communication bus 314. In FIG. 3, the communication bus 314 may be implemented using any suitable communication method and/or apparatus (e.g., Bluetooth® communication, LAN communication, WLAN communication, etc.).

In the example illustrated in FIG. 3, the input processor 302 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The input processor 302 is configured to obtain the telemetry information 136 from the infrastructure analyzer 128 of FIG. 1. As such, the input processor 302 determines whether the telemetry information 136 is obtained. If the input processor 302 determines there is not telemetry information (e.g., the telemetry information 136 is not available), then the input processor may either analyze existing telemetry information and/or provide an indication that no new telemetry information is available. If the telemetry information 136 is available, then the input processor 302 may analyze and/or otherwise parse the telemetry information 136. For example, the input processor 302 may organize the data by element (e.g., CPU, NIC, SSD, etc.), or by category (e.g., memory usage, percent utilization, etc.).

In addition, the input processor 302 generates an indication to the model trainer 304 if the telemetry information 136 is available. In some examples disclosed herein, the input processor 302 may generate the indication to the model trainer 304 if the telemetry information 136 is available and if the telemetry information 136 is different than any previous telemetry information. Alternatively, if there is no telemetry information 136 available, then the input processor 302 may generate an indication to the model executor 306 indicating to execute a neural network model.

In FIG. 3, the model trainer 304 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The model trainer 304 is configured to communicate with the input processor 302 to determine whether model training is to be performed. In examples disclosed herein, the model trainer 304 is configured to execute any suitable algorithm for supervised training of the model. For example, the model trainer 304 may train the model in an iterative approach by training the model until the model performs to a desired threshold (e.g., an accuracy of 90%) on validation data.

In the illustrated example of FIG. 3, the model executor 306 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The model executor 306 is configured to execute the model and provide a score (e.g., the score 132) in response to an indication from the input processor 302. In examples disclosed herein, the model executor 306 may execute the model in response to the model trainer 304 training the model with new telemetry information 136.

In the example illustrated in FIG. 3, the output handler 308 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In FIG. 3, the output handler 308 communicates with the model trainer 304 and/or the model executor 306 to obtain the training data and/or the score 132 to store in the training data datastore 310 and/or the model data datastore 312, respectively. Additionally, the output handler 308 communicates the resulting score 132 to the adaptive workflow manager 110 of FIG. 1.

In the example illustrated in FIG. 3, the training data datastore 310 may be implemented by any device for storing data such as, for example, flash memory, magnetic media, optical media, etc. Furthermore, the data stored in the example training data datastore 310 may be in any data format such as, for example, binary data, comma delimited data, tab delimited data, structured query language (SQL) structures, etc. The training data datastore 310 is configured to store the training data provided to the model trainer 304. In some examples disclosed herein, the training data datastore 310 may be configured to store the training data in a cloud environment. Alternatively, the training data datastore 310 may be configured to store the training data in a remote and/or local datacenter and/or any location.

In the example illustrated in FIG. 3, the model data datastore 312 may be implemented by any device for storing data such as, for example, flash memory, magnetic media, optical media, etc. Furthermore, the data stored in the example model data datastore 312 may be in any data format such as, for example, binary data, comma delimited data, tab delimited data, structured query language (SQL) structures, etc. The model data datastore 312 is configured to store the model generated by the model executor 306. In some examples disclosed herein, the model data datastore 312 may be configured to store the model in a cloud environment. Alternatively, the model data datastore 312 may be configured to store the model in a remote and/or local datacenter and/or any location.

Figure 4:
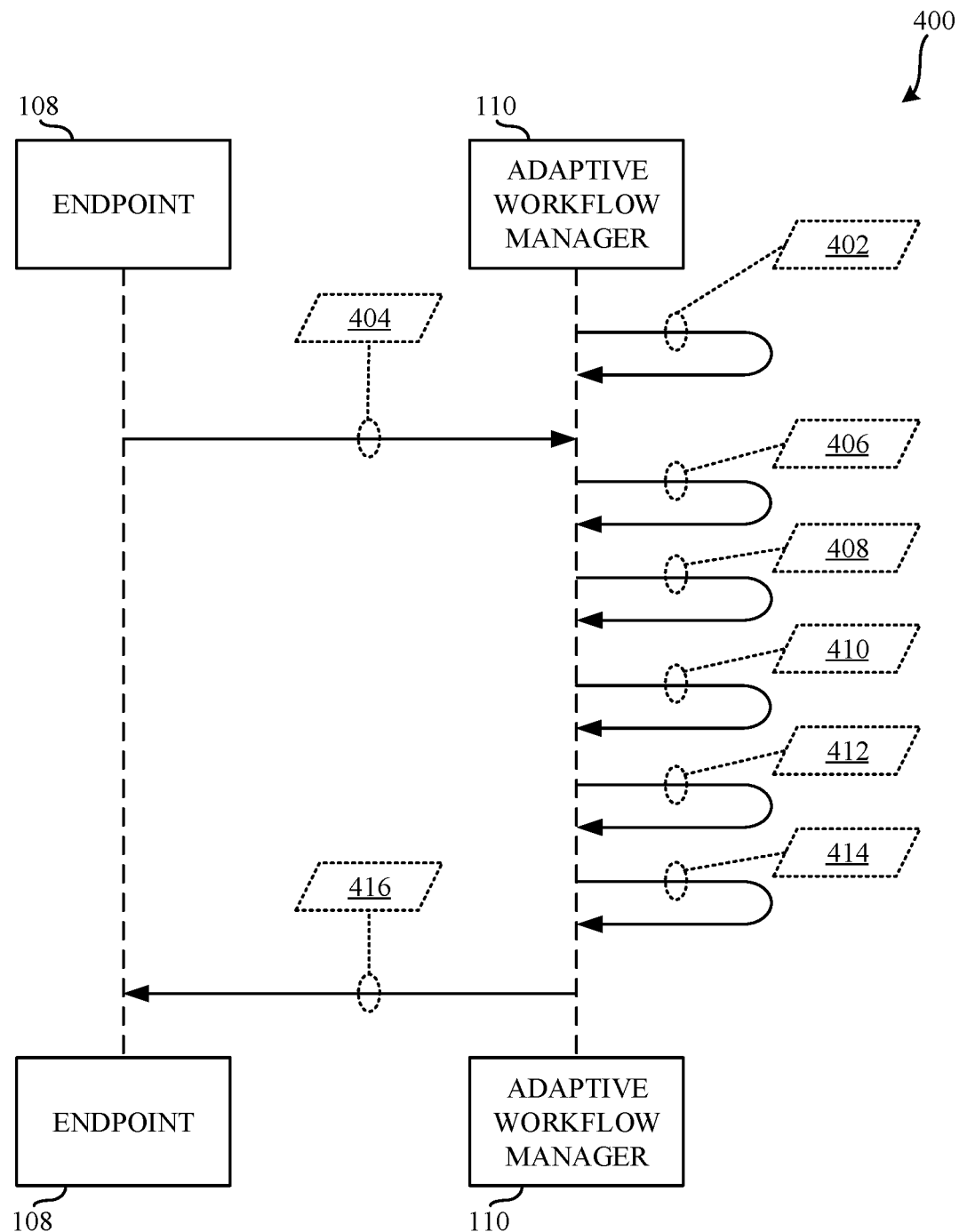
FIG. 4 is an example sequence diagram illustrating example communication between the endpoint and the adaptive workflow manager of FIG. 1.

FIG. 4 is an example sequence diagram 400 illustrating example communication between the endpoint 108 and the adaptive workflow manager 110 of FIG. 1. In FIG. 4, at an example first communication 402, the adaptive workflow manager 110 executes the instruction to retrieve all known tasks (e.g., actuators). The adaptive workflow manager 110 waits until an example second communication 404 from the endpoint 108 indicating a trigger that the objective(s) 130 are obtained. As such, the second communication 404 represents the endpoint 108 sending the objective(s) 130 to the adaptive workflow manager 110.

In the example of FIG. 4, the adaptive workflow manager 110 executes an example third communication 406, an example fourth communication 408, an example fifth communication 410, an example sixth communication 412, and an example seventh communication 414 in response to the second communication 404 from the endpoint 108.

The third communication 406 illustrates the adaptive workflow manager 110 analyzing the intent of the objective(s) 130 and determining all possible tasks (e.g., actuators) that may be utilized to complete such an objective.

The fourth communication 408 illustrates the adaptive workflow manager 110 creating a state graph of the possible pipeline and/or workflow configuration options. In response, the fifth communication 410 illustrates the adaptive workflow manager 110 initiating and executing a planning and optimization algorithm. For example, the fifth communication 410 may represent the adaptive workflow manager 110 executing the planning algorithms such as Anytime Dynamic A*, D* Lite, evolutionary algorithms (e.g., a genetic algorithm (GA)), etc.

The sixth communication 412 illustrates the adaptive workflow manager 110 determining all possible pipeline and/or workflow configuration options. Such a communication may reiterate until all possible pipeline and/or workflow configuration options are determined. In some examples disclosed herein, the possible pipeline and/or workflow configuration options may be determined by the adaptive workflow manager 110 utilizing the score 132 from the infrastructure learner 112 of FIG. 1. Alternatively, in some examples disclosed herein, the possible pipeline and/or workflow configuration options may be determined when the adaptive workflow manager 110 re-orders and generates a possible pipeline and/or workflow configuration option for each possible combination of tasks.

The seventh communication 414 illustrates the adaptive workflow manager 110 defining the optimal workflow 134 from the list of possible pipeline and/or workflow configuration options. In response, the eighth communication 416 represents the adaptive workflow manager 110 transmitting the optimal workflow 134 to the endpoint 108. In another example disclosed herein, the adaptive workflow manager 110 also transmits the optimal workflow 134 to the workload manager 114 of FIG. 1.

FIG. 5 is example pseudocode representative of a service description 106 including the objective(s) 130 of FIG. 1. In the example illustrates in FIG. 1, the example lines of code (LOCs) 501-523 represent an objective of video processing. As such, in the example illustrated in FIG. 5, the LOC 503 illustrates an example first task, "backedup," or to back up. Further, the LOCs 505-506 illustrate an example second task, "annotated." The LOC 510 illustrates an example third task, "authorized," or to authorize. Additionally, the LOCs 513-514 illustrate an example fourth task, "replicated," or to replicate. Lastly, the LOCs 518-519 illustrate an example fifth task, "transcoded," or to transcode.

In the example of FIG. 5, the objective of LOCs 501-523 is determined by the adaptive workflow manager 110 of FIG. 1. In response, possible pipeline and/or workflow configuration options are generated and weighted based on the state and objective of the infrastructure 104. In some examples disclosed herein, any of the first task, second task, third task, fourth task, and/or fifth task may include a respective objective to be analyzed by the adaptive workflow manager 110.

While an example manner of implementing the adaptive workflow manager 110 and/or the configuration composer 208 of FIG. 1 is illustrated in FIG. 2, and an example manner of implementing the infrastructure learner 112 of FIG. 1 is illustrated in FIG. 3, one or more of the elements, processes and/or devices illustrated in FIGS. 2 and/or 3 may be combined, divided, re-arranged, omitted, eliminated and/or implemented in any other way. Further, the example input analyzer 202, the example task database 204, the example intent determiner 206, the example configuration composer 208, the example configuration database 210, the example infrastructure parser 212, the example optimizer 214, the example confidence determiner 216, the example workflow selector 218, the example manager transceiver 220, and/or, more generally, the example adaptive workflow manager 110 of FIGS. 1 and/or 2, and the example input processor 302, the example model trainer 304, the example model executor 306, the example output handler 308, the example training data datastore 310, the example model data datastore 312, and/or, more generally, the example infrastructure learner 112 of FIGS. 1 and/or 3 may be implemented by hardware, software, firmware and/or any combination of hardware, software and/or firmware. Thus, for example, any of the example input analyzer 202, the example task database 204, the example intent determiner 206, the example configuration composer 208, the example configuration database 210, the example infrastructure parser 212, the example optimizer 214, the example confidence determiner 216, the example workflow selector 218, the example manager transceiver 220, and/or, more generally, the example adaptive workflow manager 110 of FIGS. 1 and/or 2, and the example input processor 302, the example model trainer 304, the example model executor 306, the example output handler 308, the example training data datastore 310, the example model data datastore 312, and/or, more generally, the example infrastructure learner 112 of FIGS. 1 and/or 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example input analyzer 202, the example task database 204, the example intent determiner 206, the example configuration composer 208, the example configuration database 210, the example infrastructure parser 212, the example optimizer 214, the example confidence determiner 216, the example workflow selector 218, the example manager transceiver 220, and/or, more generally, the example adaptive workflow manager 110 of FIGS. 1 and/or 2, and the example input processor 302, the example model trainer 304, the example model executor 306, the example output handler 308, the example training data datastore 310, the example model data datastore 312, and/or, more generally, the example infrastructure learner 112 of FIGS. 1 and/or 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example adaptive workflow manager 110 of FIGS. 1 and/or 2, and/or the example infrastructure learner 110 of FIGS. 1 and/or 3 may include one or more elements, processes and/or devices in addition to, or instead of, those illustrated in FIGS. 2 and/or 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
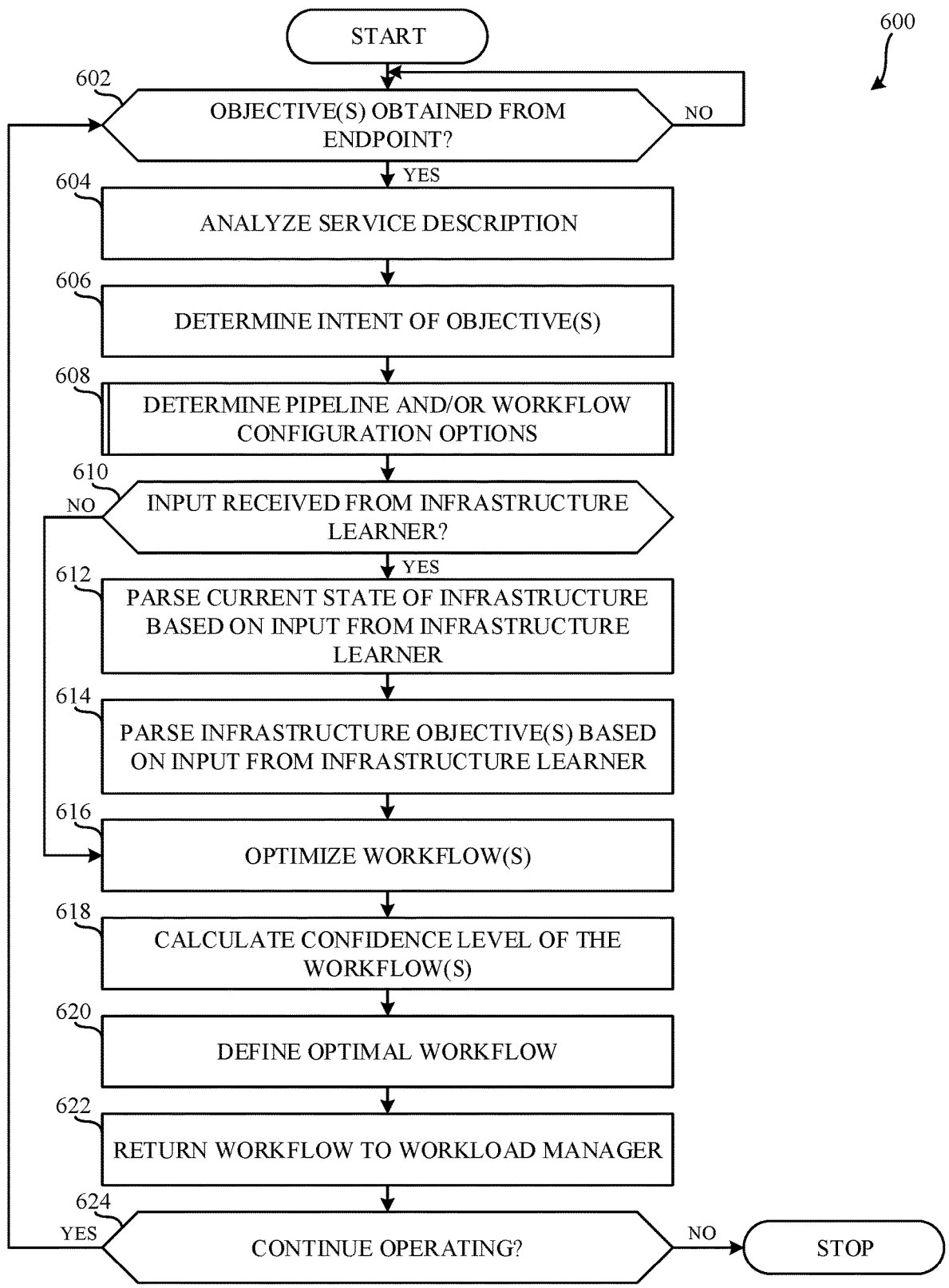
FIG. 6 is a flowchart representative of a process that may be executed to implement the adaptive workflow manager to define the optimal workflow of FIG. 1.
Figure 7:
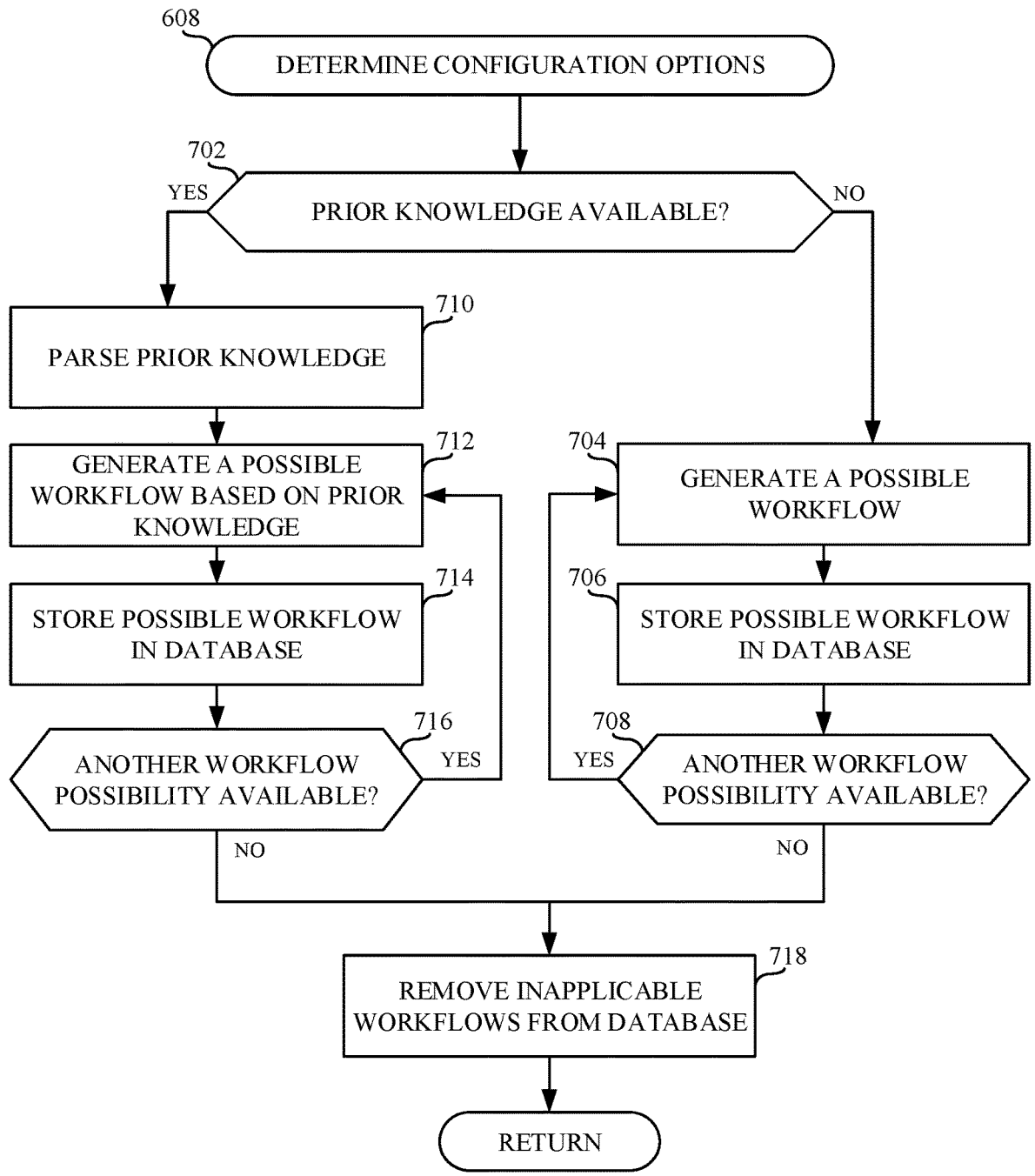
FIG. 7 is a flowchart representative of a process that may be executed to implement the configuration composer of FIG. 2 to determine the possible pipeline and/or workflow configuration options.

Flowcharts representative of example hardware logic, machine readable instructions, hardware implemented state machines, and/or any combination thereof for implementing the adaptive workflow manager 110 of FIGS. 1 and/or 2, and/or the infrastructure learner 112 of FIGS. 1 and/or 3 are shown in FIGS. 6, 7, and/or 8. The machine readable instructions may be one or more executable programs or portion(s) of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 6, 7, and/or 8, many other methods of implementing the example adaptive workflow manager 110 of FIGS. 1 and/or 2, and/or the example infrastructure learner 112 of FIGS. 1 and/or 3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6, 7, and/or 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 6 is a flowchart representative of a process 600 that may be executed to implement the adaptive workflow manager 110 to define the optimal workflow 134 of FIG. 1. In the example illustrated in FIG. 6, the input analyzer 202 determines whether the objective(s) 130 is/are obtained and/or otherwise available from the endpoint 108 of FIG. 1. (Block 602). If the input analyzer 202 determines the objective(s) 130 is/are not obtained (e.g., block 602 returns a result of NO), then control returns to block 602 and waits. In the event the input analyzer 202 determines (e.g., obtains) the objective(s) 130 from the endpoint 108 are obtained and/or otherwise available (e.g., block 602 returns a result of YES), the input analyzer analyzes the objective(s) 130. (Block 604).

In the example illustrated in FIG. 6, the intent determiner 206 determines the intent and/or otherwise objective of the objective(s) 130. (Block 606). For example, if the objective(s) 130 indicate a high-level command to perform video processing, then the intent determiner 206 can analyze such high-level command and determine the tasks associated with such a high-level command. In response, the configuration composer 208 determines the possible pipeline and/or workflow configuration options. (Block 608). The control of block 608 is explained in further detail below, in connection with FIG. 7.

In FIG. 6, the infrastructure parser 212 determines whether an input (e.g., the score 132) is received from the infrastructure learner 112 of FIG. 1. (Block 610). If the infrastructure parser 212 determines an input (e.g., the score 132) is not received (e.g., block 610 returns a result of NO), then control proceeds to block 624. The operation of block 624 is explained in further detail below. In the event the infrastructure parser 212 determines an input (e.g., the score 132) is available (e.g., block 610 returns a result of YES), then control proceeds to block 612. As such, the infrastructure parser 212 parses the current state of the infrastructure 104 of FIG. 1 based on the input (e.g., the score 132). (Block 612). In addition, the infrastructure parser 212 parses the infrastructure objective(s) based on the score 132. (Block 614).

In the example illustrated in FIG. 6, the optimizer 214 optimizes the possible pipeline and/or workflow configuration options. (Block 616). For example, the optimizer 214 implements planning and optimization algorithms such as Anytime Dynamic A*, D* Lite, evolutionary algorithms (e.g., a genetic algorithm (GA)), etc., to optimize the possible pipeline and/or workflow configuration options.

In FIG. 6, the confidence determiner 216 determines an associated confidence level with the possible pipeline and/or workflow configuration options. (Block 618). In response, the workflow selector 218 defines and/or otherwise selects the optimal possible pipeline and/or workflow configuration option (e.g., the optimal workflow 134). (Block 620). In the example illustrated in FIG. 6, the manager transceiver 220 returns the optimal workflow 134 selected by the workflow selector 218 to the workload manager 114 of FIG. 1. (Block 622). In the illustrated example of FIG. 6, adaptive workflow manager 110 determines whether to continue operating. (Block 624). In the event the adaptive workflow manger 110 determines to continue operating (e.g., block 624 returns a result of YES), then control returns to block 602 in which the input analyzer 202 determines whether the objective(s) 130 is/are obtained from the endpoint 108. For example, the adaptive workflow manager 110 may determine to continue operating if additional objectives are received from the endpoint 108.

Alternatively, if the adaptive workflow manager 110 determines not to continue operating (e.g., block 624 returns a result of NO), then the process 600 stops. The process 600 may stop in the event no more objective(s) are available.

FIG. 7 is a flowchart representative of a process that may be executed to implement the configuration composer 208 of FIG. 2 to determine the possible pipeline and/or workflow configuration options. In the example illustrated in FIG. 7, the configuration composer 208 determines whether prior knowledge is available (e.g., whether the score 132 is available). (Block 702). If the configuration composer 208 determines prior knowledge is not available (e.g., block 702 returns a result of NO), then the configuration composer 208 generates a possible pipeline and/or workflow configuration option. (Block 704). For example, the configuration composer 208 may re-order and generate one possible pipeline and/or workflow configuration option based on the possible combination of tasks.

In response to the execution of block 704, the configuration composer 208 stores the possible pipeline and/or workflow configuration option in the configuration database 210. (Block 706). In addition, the configuration composer 208 determines if another possible pipeline and/or workflow configuration option is available. (Block 708). If the configuration composer 208 determines another possible pipeline and/or workflow configuration option is available (e.g., block 708 returns a result of YES), then control returns to block 704 in which the configuration composer 208 generates another possible pipeline and/or workflow configuration option. In examples disclosed herein, the configuration composer may determine another pipeline and/or workflow configuration option is available in response to determining there is another option left to re-order the tasks of the objective(s) 130. If the configuration composer 208 determines another pipeline and/or workflow configuration option is not available (e.g., block 708 returns a result of NO), then control proceeds to block 718. The control of block 718 is explained in further detail below.

Alternatively, if the input analyzer 202 determines prior knowledge (e.g., the score 132) is available (e.g., block 702 returns a result of YES), then the configuration composer 208 can parse the prior knowledge (e.g., the score 132). (Block 710). In response to the execution of the control in block 710, the generates a possible pipeline and/or workflow configuration option. (Block 712). For example, the configuration composer 208 may determine, based on prior knowledge from the score 132, a possible pipeline and/or workflow configuration option. In response to the execution of block 712, the configuration composer 208 stores the possible pipeline and/or workflow configuration option in the configuration database 210. (Block 714). In addition, the configuration composer 208 determines if another possible pipeline and/or workflow configuration option is available. (Block 716). If the configuration composer 208 determines another possible pipeline and/or workflow configuration option is available (e.g., block 716 returns a result of YES), then control returns to block 712 in which the configuration composer 208 generates another possible pipeline and/or workflow configuration option. If the configuration composer 208 determines another pipeline and/or workflow configuration option is not available (e.g., block 716 returns a result of NO), then control proceeds to block 718.

The configuration composer 208 then removes the inapplicable workflows from the configuration database 210. (Block 718). For example, if the score indicates one of the possible pipeline and/or workflow configuration options is unsuitable (e.g., a low score such as 0.1 because the computing power of the infrastructure cannot support such a possible pipeline and/or workflow configuration option), then the configuration composer 208 can remove such one of the possible pipeline and/or configuration options from the configuration database 210. In response to the execution of block 718, control returns to block 610 of FIG. 6.

Figure 8:
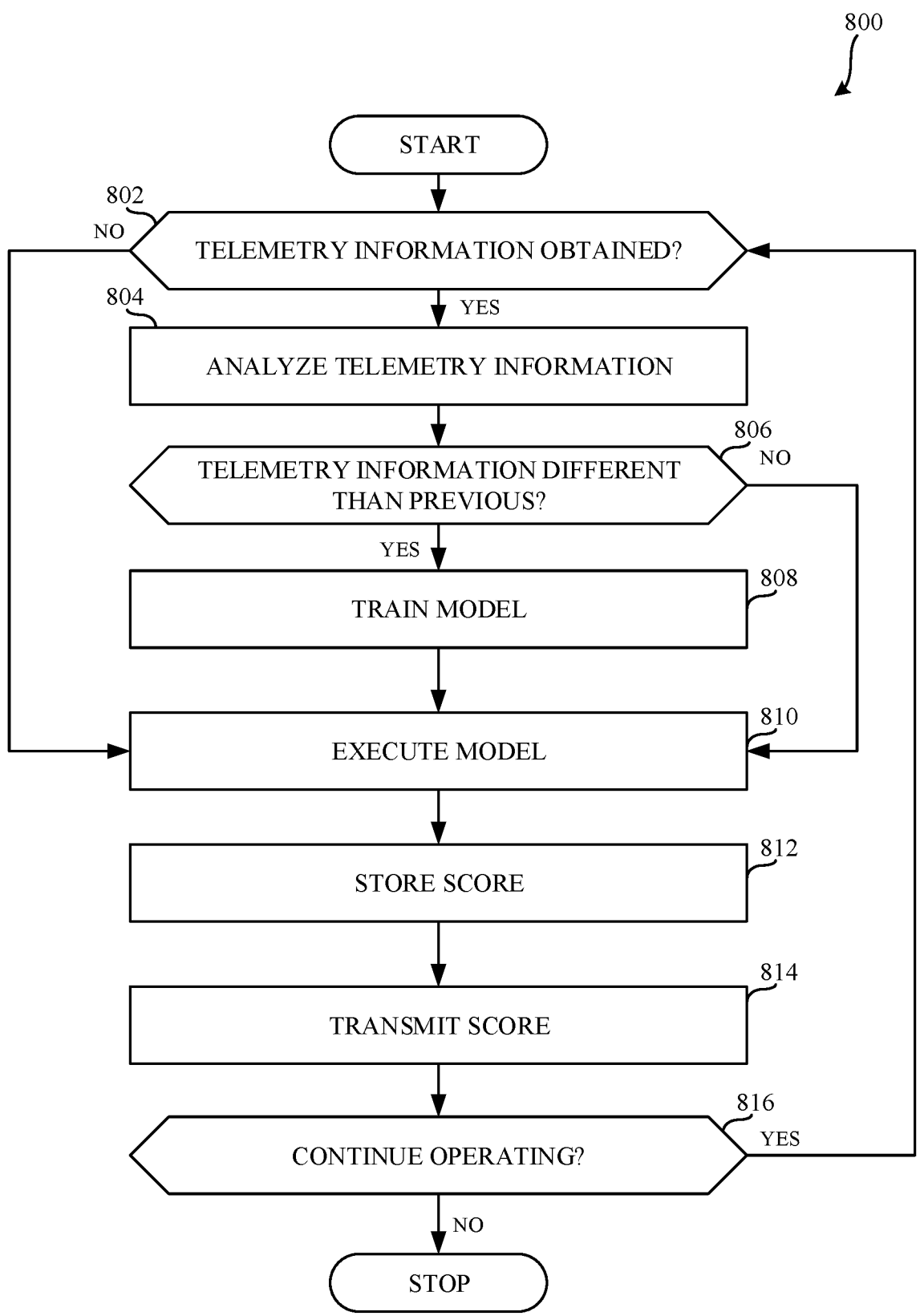
FIG. 8 is a flowchart representative of a process that may be executed to implement the infrastructure learner of FIGS. 1 and/or 3 to determine the score of FIG. 1.

FIG. 8 is a flowchart representative of a process 800 that may be executed to implement the infrastructure learner 112 of FIGS. 1 and/or 3 to determine the score 132 of FIG. 1. In FIG. 8, the input processor 302 determines whether there the telemetry information 136 is available. (Block 802). If the input processor 302 determines the telemetry information 136 is not available (e.g., block 802 returns a result of NO), then control proceeds to block 810. The control of block 810 is explained in further detail, below. Alternatively, if the input processor 302 determines the telemetry information 136 is available (e.g., block 802 returns a result of YES), then the input processor 302 analyzes the telemetry information 136. (Block 804). In response, the input processor 302 determines whether the telemetry information 136 is different than previously known telemetry information. (Block 806).

In the event the input processor 302 determines the telemetry information 136 is not different than previous telemetry information (e.g., block 806 returns a result of NO), then control proceeds to block 810. The control of block 810 is explained in further detail below. In the event the input processor 302 determines the telemetry information 136 is different than previous telemetry information (e.g., block 806 returns a result of YES), then the model trainer 304 trains the model with the telemetry information 136. (Block 808).

For example, the control of block 808 may be implemented utilizing different types of training to be performed based on the type of ML/AI model (e.g., the model stored in the model data datastore 312) and/or the expected output. For example, the model trainer 304 may utilize supervised training that uses inputs (e.g., the telemetry information 136) and corresponding expected (e.g., labeled) outputs to select parameters (e.g., by iterating over combinations of select parameters) for the ML/AI model that reduce model error. In examples disclosed herein, the model trainer 304 trains ML/AI models using any suitable training algorithm (e.g., Stochastic Gradient Descent). However, any other training algorithm may additionally or alternatively be used. In examples disclosed herein, training is performed until a threshold accuracy level is reached (e.g., 90% accuracy). Training is performed using training data. In examples disclosed herein, the training data originates from publicly available data.

In response, the model executor 306 executes the model. (Block 810). The output handler 308 then stores the resulting score (e.g., the score 132) in the model data datastore 312. (Block 812). In another example disclosed herein, the output handler 308 may also store the training data in the training data datastore 310.

Additionally, the output handler 308 transmits the score 132 to the adaptive workflow manager 110. (Block 814). As a result, the infrastructure learner 112 determines whether to continue operating. (Block 816). In the event the infrastructure learner 112 determines to continue operating (e.g., block 816 returns a result of YES), then control returns to block 802 in which the input processor 302 determines telemetry information 136 is obtained. For example, the infrastructure learner 112 may determine to continue operating if additional telemetry information 136 is received.

Alternatively, if the infrastructure learner 112 determines not to continue operating (e.g., block 816 returns a result of NO), then the process 800 stops. For example, the process 800 may stop in the event connection is interrupted to the infrastructure learner 112.

Figure 9:
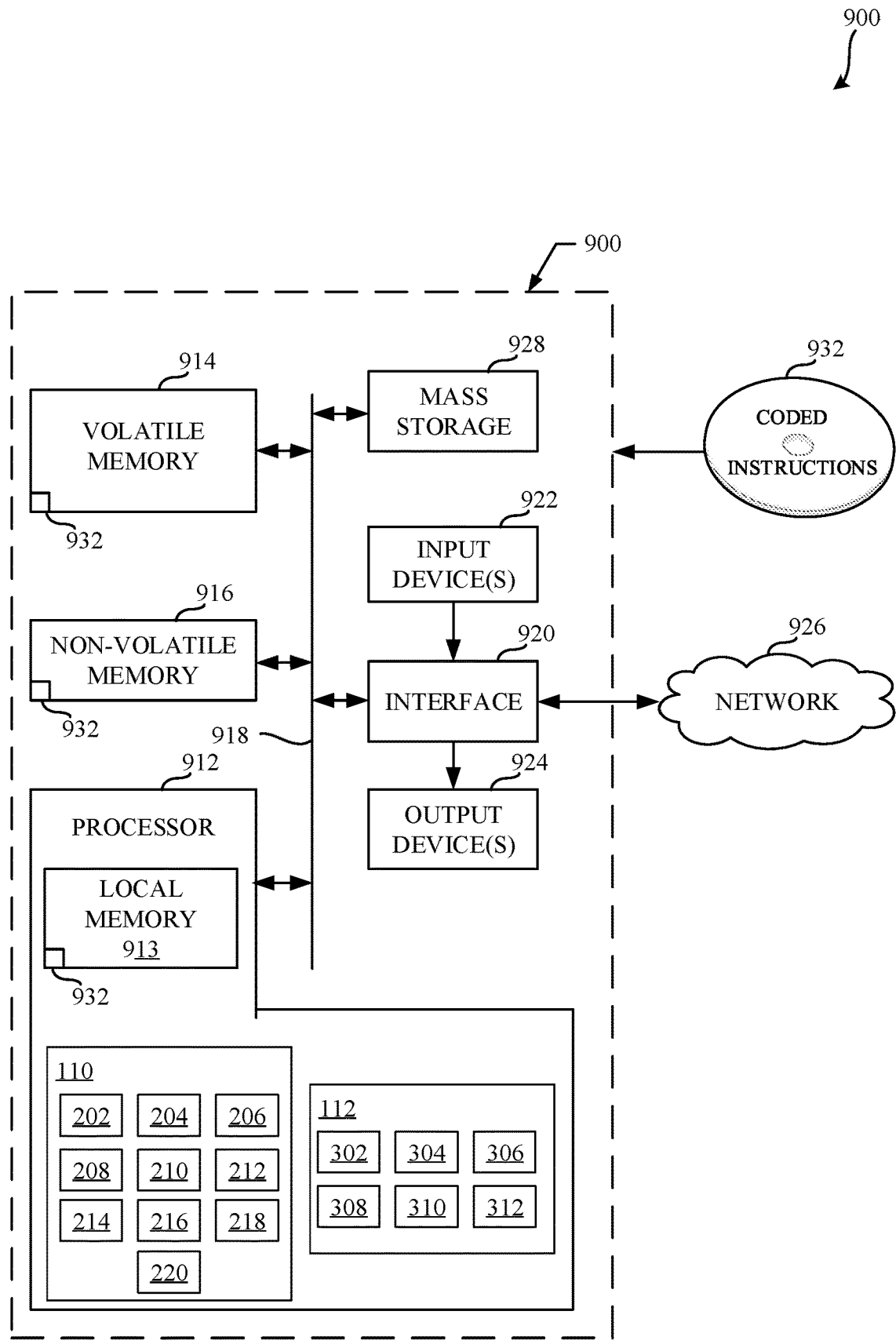
FIG. 9 is a block diagram of an example processor platform structured to execute the instructions of FIGS. 6, 7, and/or 8 to implement the adaptive workflow manager of FIGS. 1 and/or 2 and/or the infrastructure learner of FIGS. 1 and/or 3.

FIG. 9 is a block diagram of an example processor platform 900 structured to execute the instructions of FIGS. 6, 7, and/or 8 to implement the adaptive workflow manager 110 of FIGS. 1 and/or 2 and/or the infrastructure learner 112 of FIGS. 1 and/or 3. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example input analyzer 202, the example task database 204, the example intent determiner 206, the example configuration composer 208, the example configuration database 210, the example infrastructure parser 212, the example optimizer 214, the example confidence determiner 216, the example workflow selector 218, the example manager transceiver 220, and/or, more generally, the example adaptive workflow manager 110 of FIGS. 1 and/or 2, and the example input processor 302, the example model trainer 304, the example model executor 306, the example output handler 308, the example training data datastore 310, the example model data datastore 312, and/or, more generally, the example infrastructure learner 112 of FIGS. 1 and/or 3.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIGS. 6, 7, and/or 8 may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus and articles of manufacture have been disclosed that optimize workflows. The disclosed methods, apparatus and articles of manufacture improve the efficiency of using a computing device by utilizing a neural network to automatically adjust a pipeline and/or workflow based on the current and/or predicted future state of an infrastructure. The disclosed methods, apparatus and articles of manufacture generate an optimal pipeline and/or workflow based off a user objective input. As such, an optimal pipeline and/or workflow is created and automatically adjusted based on learned context changes of an infrastructure. Examples disclosed herein enable the execution of a pipeline and/or workflow in a heterogenous infrastructure that is subject to a context change. The disclosed methods, apparatus and articles of manufacture are accordingly directed to one or more improvement(s) in the functioning of a computer.

Example methods, apparatus, systems, and articles of manufacture to optimize workflows are disclosed herein. Further examples and combinations thereof include the following:

Example 1 includes an apparatus comprising an intent determiner to determine an objective of a user input, the objective indicating a task to be executed in an infrastructure, a configuration composer to compose a plurality of workflows based on the determined objective, a model executor to execute a machine learning model to create a confidence score relating to the plurality of workflows, and a workflow selector to select at least one of the plurality of workflows for execution in the infrastructure, the selection of the at least one of the plurality of workflows based on the confidence score.

Example 2 includes the apparatus of example 1, wherein the plurality of workflows composed by the configuration composer include possible configurations to execute the objective.

Example 3 includes the apparatus of example 1, wherein the confidence score includes a plurality of confidence scores corresponding to the plurality of workflows, respectively.

Example 4 includes the apparatus of example 3, wherein the plurality of confidence scores indicate a respective confidence level of the plurality of workflows based on the infrastructure.

Example 5 includes the apparatus of example 1, further including a confidence determiner to determine a confidence level of the plurality of workflows in response to the confidence score being created by the model executor.

Example 6 includes the apparatus of example 1, wherein the confidence score is based on a context of the infrastructure.

Example 7 includes the apparatus of example 1, wherein the infrastructure is a heterogenous infrastructure.

Example 8 includes a non-transitory computer readable storage medium comprising instructions which, when executed, cause at least one processor to at least determine an objective of a user input, the objective indicating a task to be executed in an infrastructure, compose a plurality of workflows based on the determined objective, execute a machine learning model to create a confidence score relating to the plurality of workflows, and select at least one of the plurality of workflows for execution in the infrastructure, the selection of the at least one of the plurality of workflows based on the confidence score.

Example 9 includes the non-transitory computer readable storage medium of example 8, wherein the plurality of workflows include possible configurations to execute the objective.

Example 10 includes the non-transitory computer readable storage medium of example 8, wherein the confidence score includes a plurality of confidence scores corresponding to the plurality of workflows, respectively.

Example 11 includes the non-transitory computer readable storage medium of example 10, wherein the plurality of confidence scores indicate a respective confidence level of the plurality of workflows based on the infrastructure.

Example 12 includes the non-transitory computer readable storage medium of example 8, wherein the instructions, when executed, further cause the at least one processor to determine a confidence level of the plurality of workflows in response to the confidence score being created.

Example 13 includes the non-transitory computer readable storage medium of example 8, wherein the confidence score is based on a context of the infrastructure.

Example 14 includes the non-transitory computer readable storage medium of example 8, wherein the infrastructure is a heterogenous infrastructure.

Example 15 includes a method comprising determining an objective of a user input, the objective indicating a task to be executed in an infrastructure, composing a plurality of workflows based on the determined objective, executing a machine learning model to create a confidence score relating to the plurality of workflows, and selecting at least one of the plurality of workflows for execution in the infrastructure, the selection of the at least one of the plurality of workflows based on the confidence score.

Example 16 includes the method of example 15, wherein the plurality of workflows include possible configurations to execute the objective.

Example 17 includes the method of example 15, wherein the confidence score includes a plurality of confidence scores corresponding to the plurality of workflows, respectively.

Example 18 includes the method of example 17, wherein the plurality of confidence scores indicate a respective confidence level of the plurality of workflows based on the infrastructure.

Example 19 includes the method of example 15, further including determining a confidence level of the plurality of workflows in response to the confidence score being created.

Example 20 includes the method of example 15, wherein the confidence score is based on a context of the infrastructure.

Example 21 includes the method of example 15, wherein the infrastructure is a heterogenous infrastructure.

Example 22 includes an apparatus comprising means for determining an objective of a user input, the objective indicating a task to be executed in an infrastructure, means for composing a plurality of workflows based on the determined objective, means for executing a machine learning model to create a confidence score relating to the plurality of workflows, and means for selecting at least one of the plurality of workflows for execution in the infrastructure, the selection of the at least one of the plurality of workflows based on the confidence score. The example means for determining an objective is implemented by the intent determiner 206 of FIG. 2. The example means for composing is implemented by the configuration composer 208 of FIG. 2. The example means for executing is implemented by the model executor 306 of FIG. 3. The example means for selecting is implemented by the workflow selector 218 of FIG. 2.

Example 23 includes the apparatus of example 22, wherein the plurality of workflows include possible configurations to execute the objective.

Example 24 includes the apparatus of example 22, wherein the confidence score includes a plurality of confidence scores corresponding to the plurality of workflows, respectively.

Example 25 includes the apparatus of example 24, wherein the plurality of confidence scores indicate a respective confidence level of the plurality of workflows based on the infrastructure.

Example 26 includes the apparatus of example 22, further including means for determining a confidence level of the plurality of workflows in response to the confidence score being created. The example means for determining a confidence level is implemented by the confidence determiner 216 of FIG. 2.

Example 27 includes the apparatus of example 22, wherein the confidence score is based on a context of the infrastructure.

Example 28 includes the apparatus of example 22, wherein the infrastructure is a heterogenous infrastructure.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to optimize a workflow, the apparatus comprising:
an intent determiner to determine an objective of a user input, the objective indicating a task to be executed in an infrastructure;
a configuration composer to compose a first workflow and a second workflow based on the determined objective;
a model executor to execute a machine learning model to create a first confidence score relating to the first workflow and a second confidence score relating to the second workflow, the first confidence score and the second confidence score based on a predicted context of the infrastructure, the predicted context of the infrastructure including at least one predicted available resource of the infrastructure or at least one predicted workload to be executed on the at least one predicted available resource; and
a workflow selector to select at least one of the first workflow or the second workflow for execution in the infrastructure, the selection of the at least one of the first workflow or the second workflow based on the first confidence score and the second confidence score.

2. The apparatus of claim 1, wherein the first workflow and the second workflow composed by the configuration composer include possible configurations to execute the objective.

3. The apparatus of claim 2, wherein the possible configurations to execute the objective include different orders of executions of two or more workloads.

4. The apparatus of claim 1, wherein the first confidence score and the second confidence score indicate respective confidence levels associated with the first workflow and the second workflow, the respective confidence levels based on the infrastructure.

5. The apparatus of claim 1, further including a confidence determiner to determine a first confidence level associated with the first workflow in response to the first confidence score being created by the model executor.

6. The apparatus of claim 1, wherein the infrastructure is a heterogenous infrastructure.

7. The apparatus of claim 1, wherein the model executor is to execute the machine learning model to determine the predicted context of the infrastructure based on time series telemetry data related to the infrastructure.

8. A non-transitory computer readable storage medium comprising instructions which, when executed, cause at least one processor to at least:
 determine an objective of a user input, the objective indicating a task to be executed in an infrastructure;
 compose a first workflow and a second workflow based on the determined objective;
 create, with a machine learning model represented by a portion of the instructions, a first confidence score relating to the first workflow and a second confidence score relating to the second workflow, the first confidence score and the second confidence score based on a predicted context of the infrastructure, the predicted context of the infrastructure including at least one predicted available resource of the infrastructure or at least one predicted workload to be executed on the at least one predicted available resource; and
 select at least one of the first workflow and the second workflow for execution in the infrastructure, the selection of the at least one of the first workflow or the second workflow based on the first confidence score and the second confidence score.

9. The non-transitory computer readable storage medium of claim 8, wherein the first workflow and the second workflow include possible configurations to execute the objective.

10. The non-transitory computer readable storage medium of claim 9, wherein the possible configurations to execute the objective include different orders of executions of two or more workloads.

11. The non-transitory computer readable storage medium of claim 8, wherein the first confidence score and the second confidence score indicate respective confidence levels associated with the first workflow and the second workflow, the respective confidence levels based on the infrastructure.

12. The non-transitory computer readable storage medium of claim 8, wherein the instructions, when executed, further cause the at least one processor to determine a first confidence level associated with the first workflow in response to the first confidence score being created.

13. The non-transitory computer readable storage medium of claim 8, wherein the infrastructure is a heterogenous infrastructure.

14. The non-transitory computer readable storage medium of claim 8, wherein the instructions, when executed, cause the at least one processor to determine, with the machine learning model, the predicted context of the infrastructure based on time series telemetry data related to the infrastructure.

15. A method to optimize a workflow, the method comprising:
 determining an objective of a user input, the objective indicating a task to be executed in an infrastructure;
 composing a first workflow and a second workflow based on the determined objective;
 executing a machine learning model to create a first confidence score relating to the first workflow and a second confidence score relating to the second workflow, the first confidence score and the second confidence score based on a predicted context of the infrastructure, the predicted context of the infrastructure including at least one predicted available resource of the infrastructure or at least one predicted workload to be executed on the at least one predicted available resource; and
 selecting at least one of the first workflow or the second workflow for execution in the infrastructure, the selection of the at least one of the first workflow or the second workflow based on the first confidence score and the second confidence score.

16. The method of claim 15, wherein the first workflow and the second workflow include possible configurations to execute the objective.

17. The method of claim 16, wherein the possible configurations to execute the objective include different orders of executions of two or more workloads.

18. The method of claim 15, wherein the first confidence score and the second confidence score indicate respective confidence levels associated with the first workflow and the second workflow, the respective confidence levels based on the infrastructure.

19. The method of claim 15, further including determining a first confidence level associated with the first workflow in response to the first confidence score being created.

20. The method of claim 15, wherein the infrastructure is a heterogenous infrastructure.

21. The method of claim 15, further including executing the machine learning model to determine the predicted context of the infrastructure based on time series telemetry data related to the infrastructure.

22. An apparatus to optimize a workflow, the apparatus comprising:
 means for determining an objective of a user input, the objective indicating a task to be executed in an infrastructure;
 means for composing a first workflow and a second workflow based on the determined objective;
 means for executing a machine learning model to create a first confidence score relating to the first workflow and a second confidence score relating to the second workflow, the first confidence score and the second confidence score based on a predicted context of the infrastructure, the predicted context of the infrastructure including at least one predicted available resource of the infrastructure or at least one predicted workload to be executed on the at least one predicted available resource; and
 means for selecting at least one of the first workflow or the second workflow for execution in the infrastructure, the selection of the at least one of the first workflow or the second workflow based on the first confidence score and the second confidence score.

23. The apparatus of claim 22, wherein the first workflow and the second workflow include possible configurations to execute the objective.

24. The apparatus of claim 22, wherein the first confidence score and the second confidence score indicate respective confidence levels associated with the first workflow and the second workflow, the respective confidence levels based on the infrastructure.

25. The apparatus of claim 22, wherein the means for executing the machine learning model is to determine the predicted context of the infrastructure based on time series telemetry data related to the infrastructure.

* * * * *